United States Patent [19]

Thomas

[11] 3,813,968

[45] June 4, 1974

[54] PIPE BEVELING APPARATUS

[75] Inventor: Robert Thomas, Houston, Tex.

[73] Assignee: Big Three Industries, Inc., Houston, Tex.

[22] Filed: Apr. 12, 1972

[21] Appl. No.: 243,151

[52] U.S. Cl. .................................. 82/4 C
[51] Int. Cl. ............................. B23b 3/22
[58] Field of Search ........................ 82/4 C

[56] References Cited
UNITED STATES PATENTS

| | | | |
|---|---|---|---|
| 2,218,147 | 10/1940 | Greenwood | 82/4 |
| 3,608,406 | 9/1971 | Paysinger et al. | 82/4 X |
| 3,717,055 | 2/1973 | Pendleton | 82/4 |

Primary Examiner—Andrew R. Juhasz
Assistant Examiner—W. R. Briggs
Attorney, Agent, or Firm—Carl B. Fox, Jr.

[57] ABSTRACT

Apparatus for beveling the ends of pipes preparatory to the welding of pipe sections together end-to-end, or preparatory to welding pipe sections to other objects. A hydraulic ran assembly holds the pipe stationary, while a traveling cutting head rotates around the periphery of the pipe to cut a bevel on the pipe end.

10 Claims, 7 Drawing Figures

PIPE BEVELING APPARATUS

SUMMARY OF THE INVENTION

The apparatus is provided primarily for providing bevels on the ends of pipes to be welded together end-to-end. In forming such welds, it is preferred that the beveled pipe ends be in flat planes, so that a uniform crack around the pipes positioned end-to-end may be achieved, this in order that a uniform weld of reliable characteristics may be formed around the pipes. Preferably the bevels have narrow inward lands therearound, and the apparatus is provided with dual cutters to form the bevels and lands simultaneously. A pipe, the end of which is to be beveled, is held in place by hydraulic rams, and a rotating plate beyond the end of the pipe carries the cutting tools which form the bevel and land. The cutting tools are advanced toward the pipe end automatically as rotation of the rotating plate occurs, and cutting is done to a depth whereby the pipe end is uniformly beveled around its entire periphery. A weight control is provided for advancement of the cutting tools whereby the cutting tools and the pipe end are protected.

With the apparatus, pipe end beveling is done extremely rapidly, in a superior fashion than has been accomplished by prior equipment. The pipe end may be placed in the apparatus and adjusted to proper position for beveling very rapidly, and correct positioning of the pipe is always uniformly attained. Rapid rotation of plate and cutters rapidly forms the bevel.

Other objects and advantages of the invention will appear from the following detailed description, reference being made to the accompanying drawings.

BRIEF DESCRIPTION OF THE DRAWINGS

FIG. 7 is an enlarged partial view showing a dual tool holder.

DESCRIPTION OF THE PREFERRED EMBODIMENT

Figure 1:
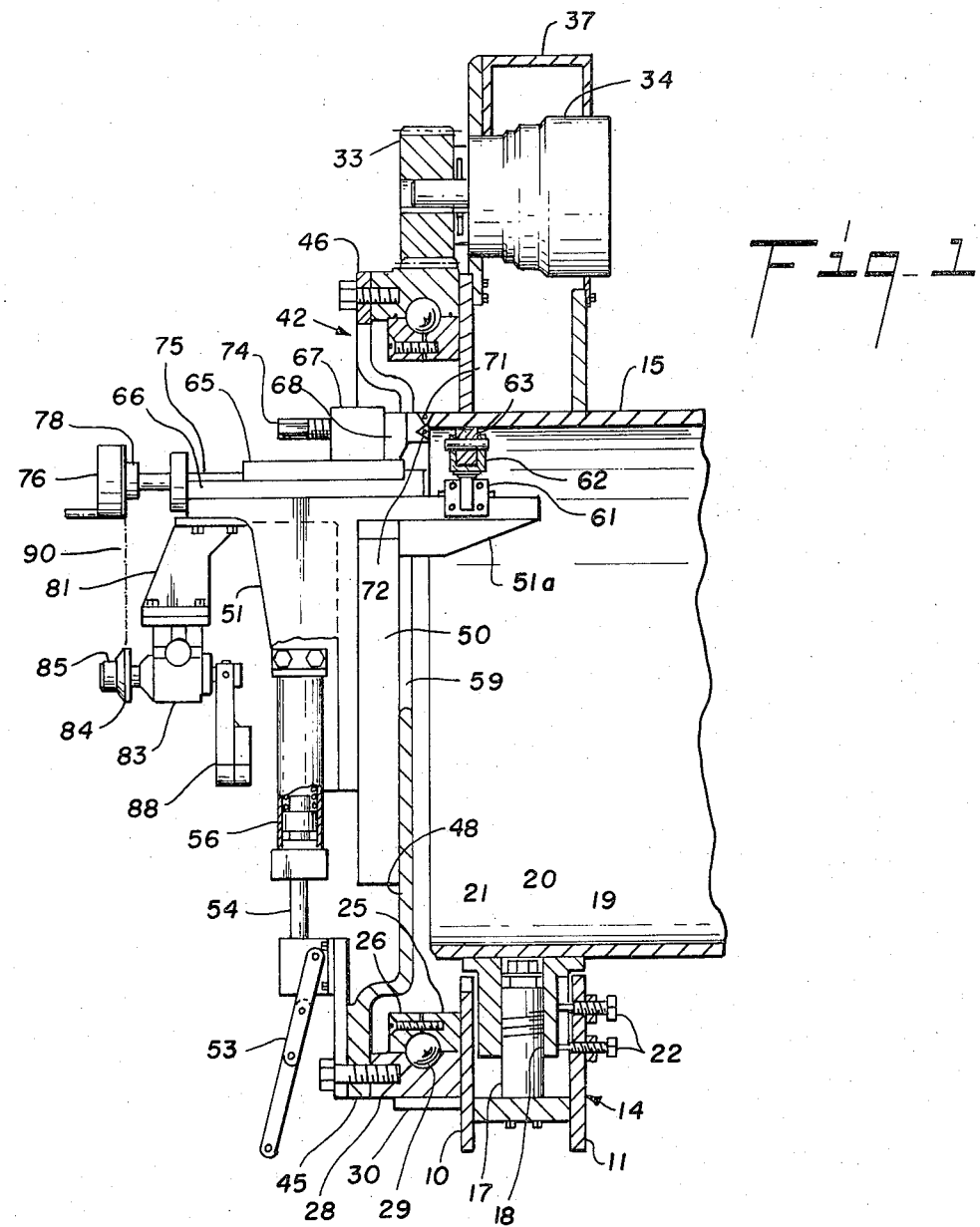
FIG. 1 is a vertical cross sectional view taken at the rotational axis of the apparatus, some elements being shown in elevation.
Figure 2:
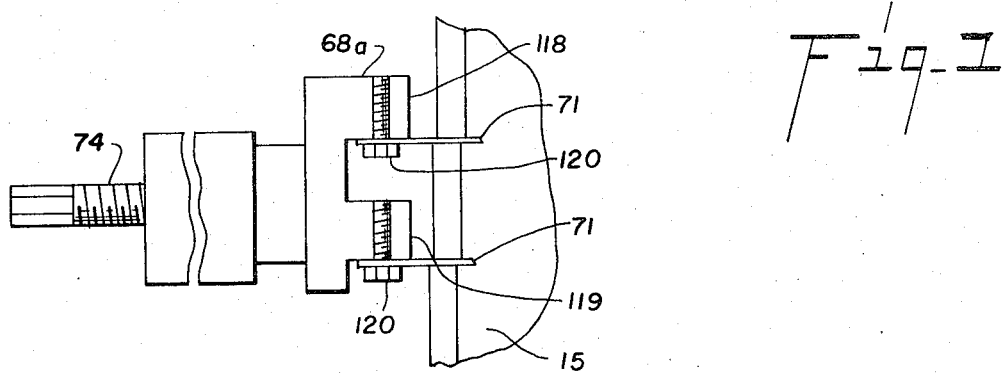
FIG. 2 is an end view of the apparatus shown in FIG. 1.
Figure 2:
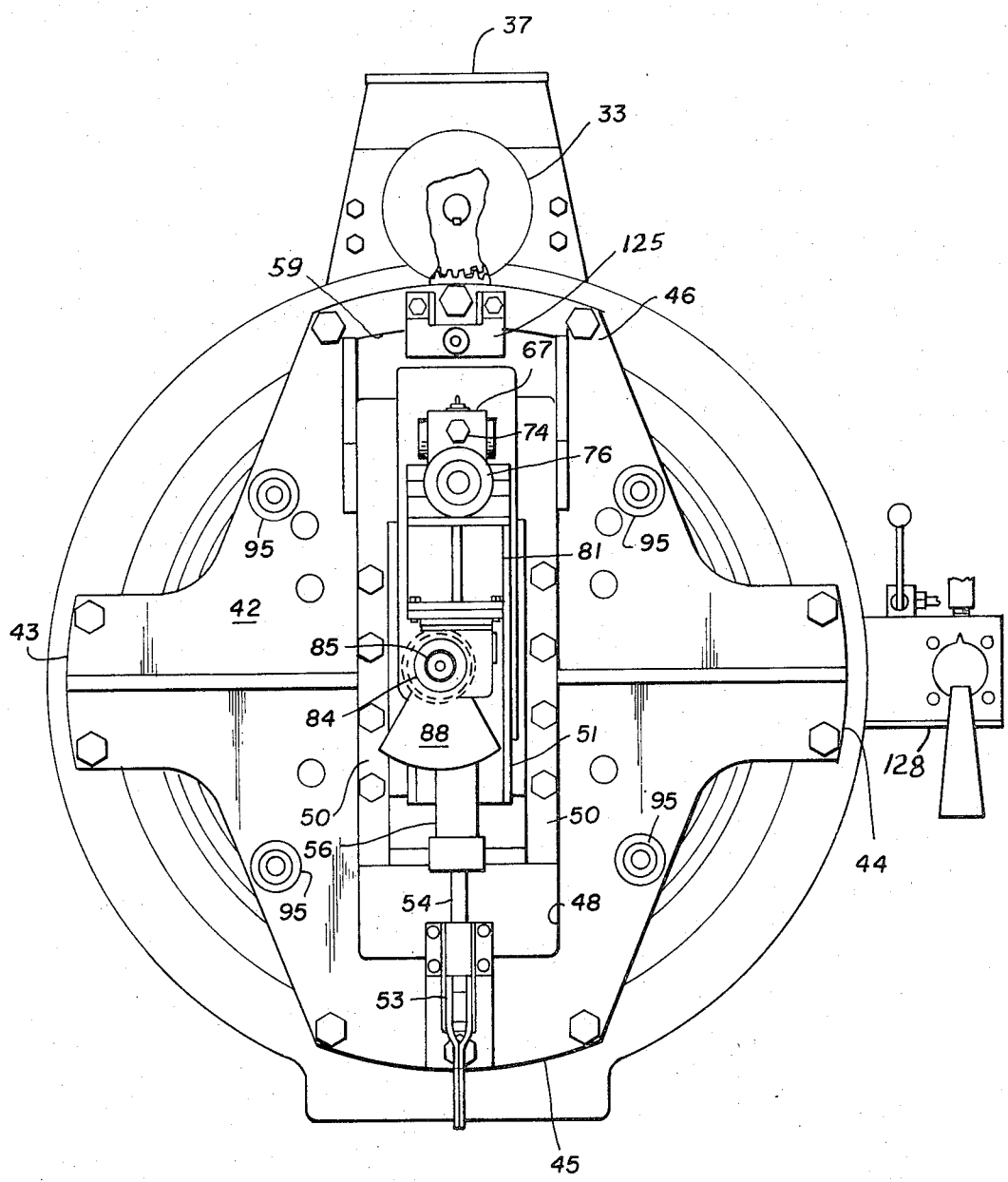
Figure 3:
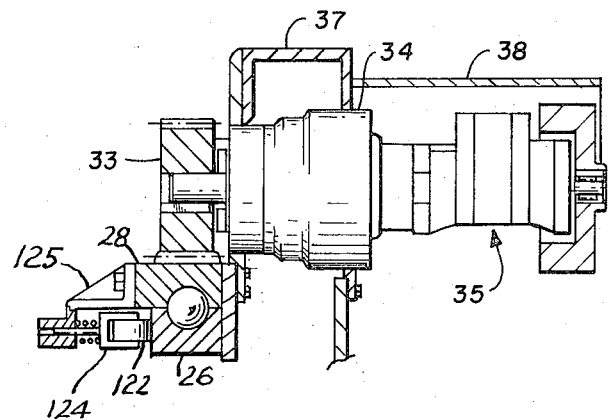
FIG. 3 is a partial elevational view, partly in cross section, showing the drive for rotation of the rotating plate.

Referring first to FIGS. 1-3 of the drawings, a pair of ring plates 10, 11 support the apparatus, these being supported in any suitable manner, not shown. Four hydraulic rams 14 are provided to center and hold the pipe 15 in proper position. Only one ram 14 is shown in the drawings, the four rams being positioned between plates 10, 11, two on a vertical diameter above and below the pipe and two on a horizontal diameter to either side of the pipe. Each ram includes a fixed tubular element 17 which is inserted into bore 18 of movable shoe 19, the bore having an annular shoulder therearound past which screw 20 is threaded into a rod 21 which is received into the bore of element 17. Guide screws 22 position the shoe 18 properly. Upon imposition of hydraulic pressure within the ram, the shoe 19 is forced radially inwardly against the pipe to hold it securely in place.

Inner bearing ring 25 is fixed around the front face of ring plate 10, and bearing ring 26 complimentary thereto is bolted to ring 25. An outer bearing ring 28 is rotatively disposed around bearing rings 25, 26, supported by plurality of circularly spaced ball bearings 29. Outer bearing ring 28 is a gear ring and has plural equally circularly spaced gear teeth 30 around its outer periphery. Gear teeth 30 are engaged by the teeth of gear 33 driven by gear box 34 and hydraulic motor 35 (FIG. 3). Gear box 34 and motor 35 supported and enclosed by housings 37, 38 which are secured to the upper sides of rings 10, 11, as shown.

Plate 42 is of irregular shape and has outwardly extending portions 43, 44, 45, 46, shaped as shown, the outer ends of which are bolted to ring 28. Plate 42 has a concave upset portion 48 of generally rectangular shape at its center, of open-front box form. Vertical ball slides 50 are mounted at opposite sides of portion 48, disposed vertically, and support bracket 51 is slidably supported thereby for upward and downward movement.

Push-pull clamp 53 moves shaft 54 upwardly or downwardly. When the clamp is closed to move shaft 54 upwardly, a compression spring in spring housing 56 is compressed to bias bracket 51 upwardly, the upper end of the spring housing being bolted thereto. When clamp 53 is released, bracket 51 may be moved downwardly.

Bracket 51 has inward extension 51a which extends through opening 59 to within the end of pipe 15. A shaft journal 61 receives the shaft of yoke 62 carrying roller 63 which is adapted to roll around the interior of pipe 15, somewhat spaced from the pipe end. A slide body 65 is slidably supported by slide 66 which is mounted atop bracket 51. Slide body 65 supports tool holder 67 into which tool head 68 is inserted. Cutters 71, 72 are screwed to the side of tool head 68, and their positions may be changed by loosening the screws that hold them to the tool head. The extension of the tool head from the tool holder may be adjusted by rotation of screw 74.

A threaded shaft 75 is engaged with threads of slide body 65, and rotation of wheel 66 causes movement of the position of the slide body, tool holder, and cutters 71, 72 with respect to the pipe end. A chain sprocket 78 is carried by shaft 75 adjacent wheel 76 Bracket 81 is affixed beneath the outer end of bracket 51 and supports a gear reducer 83, one end shaft of which carries chain sprocket 84 having hand knob 85 which when rotated in one direction engages sprocket 84 with its shaft, and which when rotated in the opposite direction disengages the sprocket. A weight or pendulum 88 of eccentric shape is fixed to the other end shaft of gear reducer 83. A chain 90 is engaged around sprockets 78, 84.

Figure 6:
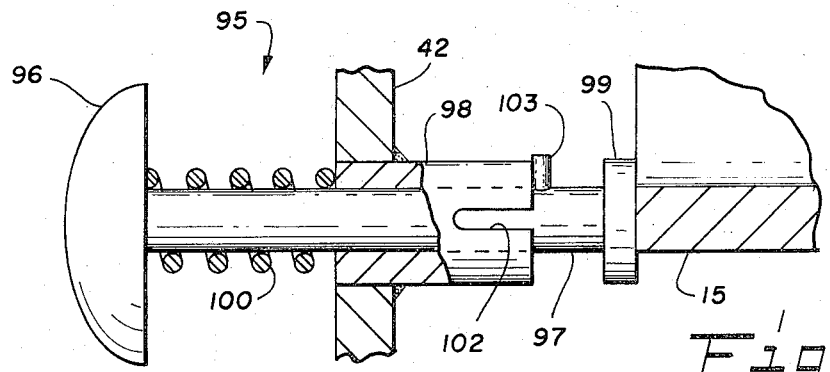
FIG. 6 is an enlarged cross sectional view of a positioning rod included in the apparatus.

Four positioning rod assemblies 95 are carried by plate 42 (FIGS. 2 and 6). Each includes a handle 96 arried on the end of a shaft or rod 97 which is slidably disposed through a bushing 98 fixed through a hole through plate 42. The inner end of rod 97 is circularly enlarged at 99. Compression spring 100 is disposed between handle 96 and the outer end of bushing 98, which is flush with the outer side of plate 42. Bushing 98 has slot 102 opening from its inner end. A pin 103 is carried by rod 97. The four rods are used to position pipe 15 prior to beveling the pipe end. The rods are extended by pushing in on handle 96 of each rod, moving pin 103 out of slot 102, and turning the rod to rotate pin 103 away from the slot to a position such as shown in FIG. 6. With all four rods extended, the pipe 15 is moved against the four rod ends 99. Then the four rams 14 are actuated by operation of control, to hold the pipe in position for beveling. After the pipe is firmly held in place, the handles 96 of the four positioning rods are pushed in and rotated to bring the pin 103 to slots 102, and released to bring the pins into the slots whereby the rods are retracted from the end of the pipe.

With the pipe in place, clamp 53 is moved to bias roller 63 against the inside of the pipe. Handle 76 is rotated to move the cutting tools 71, 72 against the pipe end. Screw 74 may be adjusted to adjust the position of the cutters if required. Then drive motor 35 is actuated to turn gear 33 through gear box 34. This provides rotation of outer ring gear 28 which rotates plate 42. As plate 42 rotates, pendulum 88, being of sufficient weight, holds the shafts of gear reducer 83 in steady position against rotation. Sprocket 78 rotating in a circle around sprocket 84, while sprocket 84 is held against rotation, turns the threads of shaft 75 in the threads of slide body 65 to advance cutters 71, 72 continuously toward the stationary pipe end. Therefore, as plate 42 and the assemblies carried thereon are rotated, the cutters advance continuously so that they will continuously cut and bevel the pipe end as rotation is continued. Once sufficient cutting of the bevel has been accomplished, handle or knob 85 is rotated to release sprocket 84 from the gear reducer shaft so that further advancement of the cutters does not occur. This permits one final rotation of the cutters without advancement so that a final uniform bevel cut is obtained. Thereafter, motor 35 is discontinued in operation, and the hydraulic rams 14 are released so that the pipe 15 may be removed from the apparatus. To prepare the apparatus for an additional pipe end beveling operation, handle 76 is rotated to retract the cutters to a suitable starting position with respect to the end of a pipe thereafter inserted into the apparatus, and sprocket 84 is re-engaged.

Figure 4:
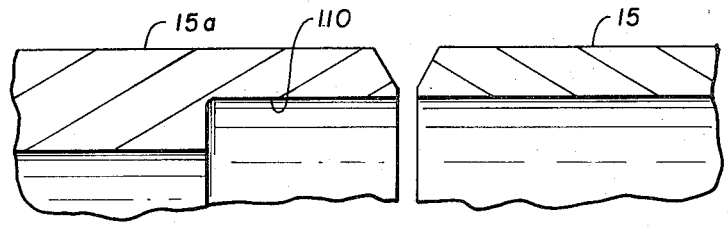
FIG. 4 is an enlarged partial cross sectional view taken transversely of the pipe walls, showing a manner of beveling the ends of pipes of different wall thicknesses.

Referring now to FIG. 4, the pipe 15 is of one wall thickness while the wall of pipe 15a is thicker. To bevel the end of pipe 15a for welding to the end of pipe 15, pipe 15 is beveled as described using the two cutters 71, 72. The wall of pipe 15a is first cut away to form interior recess 110 by using a suitable cutter therefor on tool head 68, after which cutters 71, 72 are used to bevel the pipe end. In this manner, the pipe walls are made of the same thickness at the well so that a uniform symmetrical weld is obtained.

Figure 5:
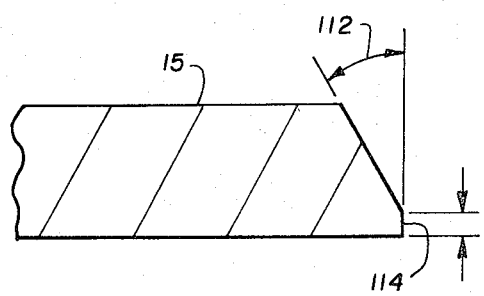
FIG. 5 is a further-enlarged cross sectional view showing the form of bevel preferred according to the invention.

FIG. 5 indicates a preferred form of bevel for use in welding the ends of pipes together. The bevel angle 112 may be of any slope, preferably in the range, 20°–35°. The depth of the land 114 is preferably fairly small, e.g., about 3/32 inch for 30 inch diameter pipe. When welding with automatic equipment wherein a guide wheel traverses the bevel groove, the bevel angle may be selected to suitably receive the guide wheel. The apparatus may be used to re-bevel pipe ends which are already beveled to the same or a different angle or form, or to bevel pipe ends not theretofore beveled.

In FIG. 3 there is shown a roller 122 mounted for rotation in compression spring biased yoke 124 supported by bracket 125 bolted to bearing ring 28. The roller rolls against bearing ring 26, and minimizes wobble between the inner and outer bearing rings. At least three rollers 122 are provided spaced around the bearing rings. In FIG. 2, one bracket 125 is shown, three others being located beneath plate 42 and not being seen in FIG. 2.

The device 128, FIG. 2, is a hydraulic fluid control for controlling the rams 14 and hydraulic motor 35.

While a preferred form of the apparatus has been shown in the drawings and described, many modifications thereof may be made by persons skilled in the art without departing from the spirit of the invention, and it is intended to protect by Letters Patent all forms of the invention falling within the scope of the following claims.

I claim:

1. Apparatus for shaping the ends of pipes, comprising support ring means for receiving the end of a pipe therethrough, radially movable pipe holding means for releasably holding said pipe spaced inwardly of said support ring means, first bearing ring means supported spaced outwardly around the pipe by said support ring means, second bearing ring means disposed to rotate about said first bearing ring means, drive means for rotating said second bearing ring means, cutter means carried by said second bearing ring means disposed axially beyond the end of said pipe and means for moving said cutter means against the end of said pipe held within said support ring means to shape the end thereof as said second bearing ring means is rotated by said drive means.

2. The combination of claim 1, said second bearing ring means having ring gear means, said drive means comprising motor means having gear means engaged with said ring gear means.

3. The combination of claim 2, including plate means disposed across said second bearing ring means and supported thereby to be rotatable therewith, frame means supported by said plate means for radial movements with respect to said second bearing ring means, tool support means carried by said frame means, means for moving said tool support means axially of said second bearing ring means, said cutter means being supported by said tool support means.

4. Apparatus for shaping the ends of pipes, comprising support ring means, pipe holding means for releasably holding a pipe within said support ring means, first bearing ring means supported by said support ring means, second bearing ring means disposed to rotate about said first bearing ring means, drive means for rotating said second bearing ring means, cutter means carried by said second bearing ring means, and means for moving said cutter means against the end of a pipe held within said support ring means to shape the end thereof as said second bearing ring means is rotated by said drive means, said second bearing ring means having ring gear means, said drive means comprising motor means having gear means engaged with said ring gear means, including plate means disposed across said second bearing ring means and supported thereby, frame means supported by said plate means for radial movements with respect to said second bearing ring means, tool support means carried by said frame means, means for moving said tool support means axially of said second bearing ring means, said cutter means being supported by said tool support means, said frame means having slide means disposed parallel to the axis of said second bearing ring means and slide body means slidably disposed thereon supporting said tool support means, screw means rotatable to slide said slide body means on said slide means toward and away from the pipe end, shaft means held against rotation by eccentric weight means affixed thereto supported by said frame means radially inward of said screw means, rotation transfer means connecting said screw means and shaft means, whereby on rotation of said plate means and frame means said screw means advances said tool support means and cutter means toward the pipe end to progressively shape the same.

5. The combination of claim 4, including roller means carried by said frame means disposed to roll within the end of the pipe, and means for resiliently biasing said frame means outwardly to urge said roller means against the interior of the pipe, said roller means positioning said cutter means radially of the pipe to shape the end thereof.

6. The combination of claim 5, said shaft means including gear reduction means between said eccentric weight means and said rotation transfer means to alter the rate of advancement of said cutter means with respect to the rate of rotation of said frame means.

7. The combination of claim 6, said pipe holding means comprising hydraulic ram means supported by said support ring means.

8. The combination of claim 6, said motor means being a hydraulic motor.

9. The combination of claim 6, said cutter means being a pair of cutter blades, one cutter blade forming a bevel around the pipe end and the other cutter blade forming a land around the pipe end, the positions of said cutter blades being adjustable.

10. The combination of claim 6, said cutter means comprising two pairs of cutter blades, one cutter blade of each pair forming a bevel around the pipe end and the other cutter blade of each pair forming a land around the pipe end, said pairs of cutter blades being circularly spaced with respect to the pipe periphery and one said pair of cutter blades is positioned to cut deeper following the cuts made by the other said pair of cutter blades whereby the rate of cutting is doubled with respect to the rate of rotation of said second bearing ring means.

* * * * *